United States Patent
Kazami

(10) Patent No.: US 7,379,202 B2
(45) Date of Patent: May 27, 2008

(54) IMAGE RECORDING APPARATUS AND METHOD

(75) Inventor: Kazuyuki Kazami, Tokyo (JP)

(73) Assignee: Nikon Corporation, Tokyo (JP)

( * ) Notice: Subject to any disclaimer, the term of this patent is extended or adjusted under 35 U.S.C. 154(b) by 843 days.

(21) Appl. No.: 10/365,540

(22) Filed: Feb. 13, 2003

(65) Prior Publication Data

US 2003/0123078 A1   Jul. 3, 2003

Related U.S. Application Data

(63) Continuation of application No. 09/963,600, filed on Sep. 27, 2001, now abandoned, which is a continuation of application No. 09/556,792, filed on Apr. 25, 2000, now abandoned, which is a continuation of application No. 08/954,031, filed on Oct. 20, 1997, now abandoned.

(60) Provisional application No. 60/040,919, filed on Mar. 27, 1997.

(30) Foreign Application Priority Data

Oct. 22, 1996  (JP)  ................... 8-279460

(51) Int. Cl.
H04N 1/21 (2006.01)
H04N 5/907 (2006.01)
(52) U.S. Cl. .................. 358/1.16; 358/404; 348/231.1; 348/231.2
(58) Field of Classification Search ...... 358/1.16–1.17, 358/404, 444, 468; 710/56, 74; 707/101, 707/205; 348/231.1, 231.2
See application file for complete search history.

(56) References Cited

U.S. PATENT DOCUMENTS

| 5,220,438 A | 6/1993 | Yamamoto |
| 5,231,514 A | 7/1993 | Nakamura |
| 5,251,297 A | 10/1993 | Takayanagi |
| 5,280,363 A * | 1/1994 | Nakamura et al. .......... 386/119 |
| 5,335,085 A | 8/1994 | Nakatsuma |
| 5,404,316 A | 4/1995 | Klinger et al. |
| 5,438,433 A | 8/1995 | Reifman et al. |
| 5,477,337 A | 12/1995 | Schuler |
| 5,481,303 A | 1/1996 | Uehara |
| 5,513,306 A | 4/1996 | Mills et al. |
| 5,522,067 A | 5/1996 | Swire |
| 5,619,257 A | 4/1997 | Reele et al. |
| 5,652,830 A | 7/1997 | Yamamoto et al. |
| 5,671,410 A | 9/1997 | Mizuno et al. |
| 5,726,770 A * | 3/1998 | Harada ....................... 358/444 |

(Continued)

FOREIGN PATENT DOCUMENTS

JP    58035640 A  *  3/1983

(Continued)

Primary Examiner—Scott A. Rogers
(74) Attorney, Agent, or Firm—Oliff & Berridge, PLC

(57) ABSTRACT

An image recording apparatus records image files on a recording medium. The image recording apparatus automatically selects disused files and automatically deletes them at the appropriate timing. A storage device acquires an image file from, e.g., an imaging component or an external terminal and records the image file together with time information on a recording medium. A controller monitors the recording area of the recording medium and automatically deletes image files for which the time information is old in accordance with the monitored usage status of the recording area.

14 Claims, 11 Drawing Sheets

U.S. PATENT DOCUMENTS

| | | | |
|---|---|---|---|
| 5,729,786 A * | 3/1998 | Yamada et al. | 399/42 |
| 5,742,339 A | 4/1998 | Wakui | |
| 5,822,493 A * | 10/1998 | Uehara et al. | 386/109 |
| 5,943,050 A | 8/1999 | Bullock et al. | |
| 6,092,105 A * | 7/2000 | Goldman | 709/217 |
| 7,020,658 B1 * | 3/2006 | Hill | 707/101 |
| 2003/0193602 A1 * | 10/2003 | Satoh et al. | 348/333.12 |

FOREIGN PATENT DOCUMENTS

| | | |
|---|---|---|
| JP | A-4-6971 | 1/1992 |
| JP | A-5-233411 | 9/1993 |
| JP | 6-90422 | 3/1994 |
| JP | 07049803 A * | 2/1995 |
| JP | 07160549 A * | 6/1995 |
| JP | A-8-111730 | 4/1996 |

* cited by examiner

IMAGE RECORDING APPARATUS AND METHOD

RELATED PROVISIONAL APPLICATION

This is a Continuation of application Ser. No. 09/963,600 filed Sep. 27, 2001, now abandoned, which in turn is a Continuation of application Ser. No. 09/556,792 filed Apr. 25, 2000, now abandoned, which in turn is a Continuation of application Ser. No. 08/954,031 filed Oct. 20, 1997 now abandoned. The entire disclosure of the prior application(s) is hereby incorporated by reference herein in its entirety.

This nonprovisional application claims the benefit of Provisional Application No. 60/40,919, filed Mar. 27, 1997.

INCORPORATION BY REFERENCE

The disclosure of the following priority application is herein incorporated by reference: Japanese Patent Application No. 08-279460 filed Oct. 22, 1996.

BACKGROUND OF THE INVENTION

1. Field of Invention

The present invention relates to an image recording apparatus for recording image information in an image file format on a recording medium wherein the image information is input from an imaging component or an external terminal. In particular, it relates to an image recording apparatus that automatically deletes image files on the recording medium at an appropriate time.

2. Description of Related Art

Image recording apparatus that record image information input from an imaging component in an image file format on a recording medium are known in the art. Electronic cameras and image editing machines are examples of such recording apparatus.

In such image recording apparatus, memory cards (e.g., flash memories), magnetooptical recording media, and the like, have been used as image recording media. Such recording media are reusable by deleting image files that are no longer being used. These conventional image recording apparatus provide a function for deleting image files by manual operation. For example, an apparatus for batch deleting image files on the recording medium by manual operation is described in Japanese Laid-Open Patent Application No. 6-90422.

Also, an apparatus is known for successively deleting image files on the recording medium by manual specification while being displayed on a monitor screen.

In such conventional examples, it is necessary for the user to choose a suitable time to execute the deletion operations. Therefore, the user must always be conscious-of the usage conditions of the recording media in order to determine an appropriate time for deletion.

Such determinations are often missed. Therefore, in an image recording apparatus such as an electronic camera, valuable shooting opportunities are frequently missed by the user not being aware of the reduction of available capacity of the recording medium. For example, if the available capacity is not sufficient to store an image, the user must delete an image prior to storing a new one. If the user does not realize that there is not sufficient capacity, the user may not be able to store a new image, which would then be lost. In addition, the user must select the image files, one by one, to be deleted using a complicated selection operation. Moreover, important image files are often deleted because the selected image files are deleted on the spot.

SUMMARY OF THE INVENTION

The present invention aims to solve the problems of the prior art by providing an image recording apparatus that can automatically select image files no longer being used and automatically delete them at an appropriate time.

Another aspect of the present invention is to provide an image recording apparatus that appropriately prevents a condition wherein the available capacity of the recording medium is insufficient to store further images.

A third aspect of the present invention is to provide an image recording apparatus whereby there is little risk of unintentionally deleting important image files.

A fourth aspect of the invention is to provide an image recording apparatus that can efficiently reduce the frequency of deletion of image files.

A fifth aspect of the invention is to provide an image recording apparatus that automatically deletes disused image files at a time suited for new image files to be recorded.

Additional aspects and advantages of the invention will be set forth in part in the description which follows and in part will be obvious from the description or may be learned from practice of the invention. The aspects and advantages of the invention may be realized and attained by means of the instrumentalities and combinations particularly pointed out in the appended claims.

Apparatus according to a first embodiment of the invention includes recording means for acquiring an image file from an imaging component (e.g., a CCD) or an external terminal (e.g., a host computer), and for recording the image file together with time information on a recording medium. The apparatus also includes monitoring means for monitoring the recording area of the recording medium, and first automatic deleting means for deleting image files for which the time information is old in accordance with the usage status of the recording area monitored by the monitoring means.

The recording means acquires image files including image information. The recording means records image files together with time information on the recording medium. The recording area of the recording medium changes consequent to such recording operation. The monitoring means monitors changes in the recording area. The first automatic deleting means deletes image files having old time information and updates the usage status of the recording area monitored by the monitoring means. The deletion operation may include an operation for establishing a condition for overwriting part or all of the recording area occupied by an image file flagged for deletion and overwriting the recording area with another image file.

By such an operation, an available area of the recording medium can be automatically secured at a timing matched to the change of the usage status of the recording area.

In an electronic camera, and the like, photographed image files are stored temporarily on a memory card, or the like. The probability is high that, with regard to important image files, within a few days to a few weeks from the date photographed, the image files will be transferred to higher capacity recording media and carefully archived, printed on paper media, or the like. Consequently, in regard to image files having old time information, the probability is high that these files are either useless or have been processed, e.g., archived. Thus, no longer used image files can be deleted with high probability by deleting old image files preferentially, as in the present invention.

In a further embodiment of the invention, the monitoring means acquires or computes the available capacity of the recording area of the recording medium and the first automatic deleting means successively deletes image files for which the time information is oldest each time the available capacity acquired or computed by the monitoring means falls below a predetermined limit. The monitoring means acquires or computes the available capacity of the recording medium. The first automatic deleting means successively deletes image files in order of older time information each time the available capacity falls below the predetermined limit.

Another embodiment of the invention includes a user interface that presents an image file anticipated to be deleted by the first automatic deleting means. The user interface inquires as to whether or not the deletion operation of the image file is approved. The first automatic deleting means performs deletion of the image file if the deletion operation is approved via the user interface. This user interface presents an image file anticipated to be deleted by the first automatic deleting means and inquires as to whether or not the deletion operation of the image file is approved. The first automatic deleting means executes file deletion processing on image files for which the deletion operation has been approved by the user interface.

Apparatus according to a further embodiment of the invention includes a recording means for acquiring an image file from an imaging component or an external terminal, and for recording the image file on a recording medium. The apparatus also includes a disused image establishing means for establishing whether or not an image file on the recording medium is disused in accordance with an external selection operation. A monitoring means monitors the recording area of the recording medium, and second automatic deleting means deletes image files established as disused by the disused image establishing means in accordance with the usage status of the recording medium monitored by the monitoring means.

The recording means acquires image files including image information, and the like. The recording means records these image files on a recording medium. The recording area of the recording medium changes consequent to such recording operation. The monitoring means monitors changes in the recording area. Meanwhile, the disused image establishing means establishes whether or not an image file on the recording medium is disused in accordance with an external operation that identifies the image file as such. The second automatic deleting means deletes image files established as disused by matching the usage conditions of the recording area monitored in the monitoring means.

The deletion operation may include an operation for overwriting, with another image file, all or a part of the recording area occupied by an image file that is to be deleted and establishing a condition whereby overwriting is possible. By such operation, the available capacity on the recording medium can be secured properly and automatically at a timing matched to the change of the usage status of the recording area.

In an even further embodiment of the invention, the monitoring means acquires or computes the available capacity of the recording area of the recording medium and the second automatic deleting means successively deletes image files established as disused by the disused image establishing means each time the available capacity acquired or computed by the monitoring means falls below a predetermined limit. The monitoring means acquires or computes the available capacity of the recording medium. The second automatic deleting means successively deletes image files established as disused each time this available capacity falls below a predetermined limit.

In a further embodiment of the invention, the second automatic deleting means deletes image files established as disused by the disused image establishing means in priority order of larger file capacity. By such operation, there is no need to frequently delete image files for which the file capacity is small. Thus, the frequency of deletion of image files is reduced assuredly.

Another embodiment of the invention further includes a user interface for presenting an image file anticipated to be deleted by the second automatic deleting means, and for inquiring whether the deletion operation of the image file is approved. The second automatic deleting means performs deletion of the image file if the deletion operation is approved via the user interface.

Another embodiment of the invention includes a limit modifying means for raising and lowering the limit corresponding to the file capacity of image files acquired by the recording means. Consequently, it becomes possible to secure on the recording medium the necessary available capacity at a timing matched to the file capacity of the acquired image file.

As explained above, in a first embodiment of the invention, image files are automatically deleted in accordance with the usage status of the recording medium. Consequently, available space on the recording medium can be secured automatically at an appropriate timing matched to the change of recording area of the recording medium.

Also, image files having old time information are preferentially made the object of deletion. Therefore, image files for which the necessary post-processing (archive processing, print processing, and the like) has already been performed, or those image files that originally were unnecessary, can be deleted with high probability. By such an effect, operations such as the user consciously selecting and deleting image files is eliminated. Thus, the complications concomitant with the conventional deletion operation is resolved to a great extent.

In a further embodiment of the invention, the files having the oldest time information are deleted sequentially each time the available capacity of the recording medium falls below a predetermined limit. Consequently, it is possible to secure available space on the recording medium at an appropriate timing corresponding promptly with the reduction of available capacity of the recording medium.

As a result, in an apparatus such as an electronic camera, inconveniences such as missing a valuable shooting opportunity can be prevented without the user having to closely pay attention to the available capacity of the recording medium.

In a further embodiment of the invention, external approval is sought by presenting the image file of a candidate for deletion before performing the deletion operation. Consequently, there is no risk of an important image file being deleted by accident. Also, because the candidate for deletion is automatically presented, the operation of selecting a candidate for deletion as in the conventional example becomes unnecessary. Consequently, it becomes possible to complete the deletion operation quickly with a simple yes/no confirmation alone. As a result, in an apparatus such as an electronic camera, the risk of missing a valuable shooting opportunity is reduced.

In a further embodiment of the invention, image files are automatically deleted in accordance with the usage status of the recording medium. Consequently, it becomes possible to automatically secure available space on the recording medium at an appropriate timing matched to the change of recording area on the recording medium. Also, because disused image files are flagged for deletion in advance, there is no unintentional deletion of important image files.

Additionally, the invention differs greatly from conventional devices from the standpoint that timing can be placed between the selection operation and the deletion operation of disused image files. Therefore, the user can select the disused image files in advance with presence of mind. Thus, there is no need to select a candidate for deletion in a hurry or when in a flustered situation such as when photographing and when editing.

In yet another embodiment of the invention, image files established in advance as disused are deleted sequentially each time the available capacity of the recording medium falls below a predetermined limit. Consequently, it becomes possible to secure available space on the recording medium at an appropriate timing corresponding with the reduction of available capacity of the recording medium. As a result, in an apparatus such as an electronic camera, inconveniences such as missing a valuable shooting opportunity can be prevented without paying attention to the available capacity of the recording medium.

In a further embodiment, image files are deleted in order of greater file capacity from those established as disused. Consequently, the frequency of deletion of image files can be reduced efficiently.

In another embodiment, external confirmation is sought by presenting the image file established in advance as disused before performing the deletion operation. Consequently, the risk of deleting an image file accidentally becomes less.

In yet another embodiment, the limit corresponding to the file capacity of image files read in from outside is raised and lowered. Consequently, it becomes possible to secure on the recording medium, at an appropriate time, available capacity corresponding to the file capacity of the image file being read in from outside.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

FIGS. 1-5 are high-level representations of various aspects of the invention.

Apparatus according to a first aspect of the invention includes a recording means 1 for acquiring an image file from an imaging component or an external terminal. The recording means records the image file together with time information on a recording medium R. A monitoring means 2 monitors the recording area of the recording medium R, and a first automatic deleting means 3 deletes image files for which the time information is old in accordance with the usage status of the recording area monitored by the monitoring means 2.

The recording means 1 acquires image files including image information. The recording means 1 records these image files together with time information on the recording medium R. The recording area of the recording medium R changes consequent to such recording operation. The monitoring means 2 monitors such changes in the recording area. The first automatic deleting means 3 deletes image files having old time information and updates the usage status of the recording area monitored by the monitoring means 2. The deletion operation may include an operation for establishing a condition for overwriting all or part of the recording area occupied by an image file flagged for deletion and overwriting the recording area with another image file.

By such an operation, an available area of the recording medium R can be automatically secured at a timing matched to the change of the usage status of the recording area.

In an electronic camera, and the like, photographed image files are stored temporarily on a memory card, or the like. The probability is high that, with regard to important image files, within a few days to a few weeks from the date photographed, the image files will be transferred to (or at least copied to) higher capacity recording media and carefully archived, printed on paper media, or the like. Consequently, in regard to image files having old time information, the probability is high that these files are either useless or have been subjected to post processing, such as archiving. Thus, no longer used image files can be deleted with high probability by deleting old image files preferentially, as in the present invention.

In a further aspect of the invention, the monitoring means 2 acquires or computes the available capacity of the recording area of the recording medium R and the first automatic deleting means 3 successively deletes image files for which the time information is oldest each time the available capacity acquired or computed by the monitoring means 2 falls below a predetermined limit. The monitoring means 2 acquires or computes the available capacity of the recording medium R. The first automatic deleting means 3 successively deletes image files in order of older time information each time this available capacity falls below a predetermined limit.

Figure 1:
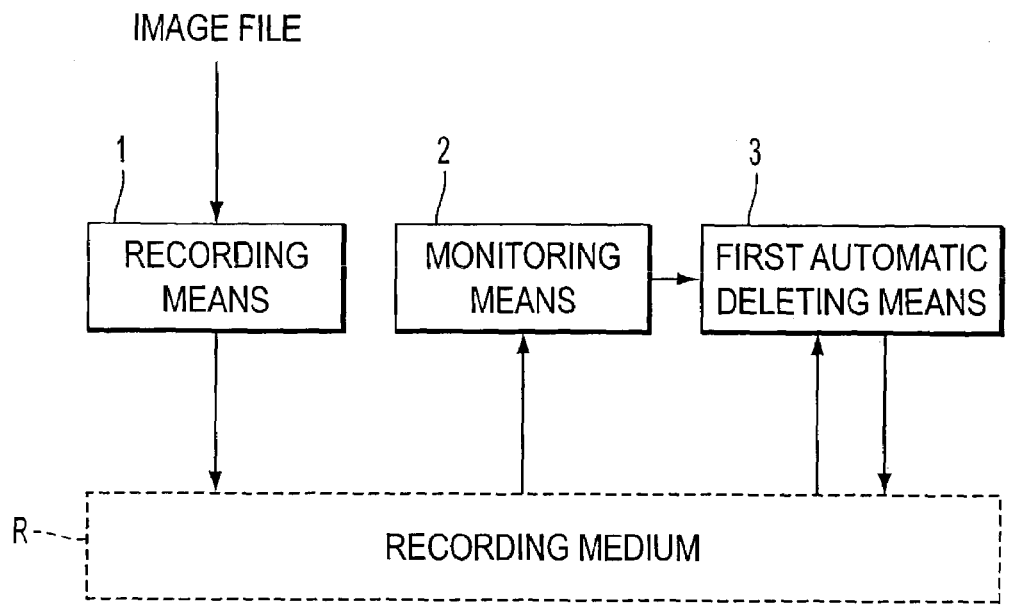
FIG. 1 is a high-level functional diagram of a first aspect of the invention.
Figure 2:
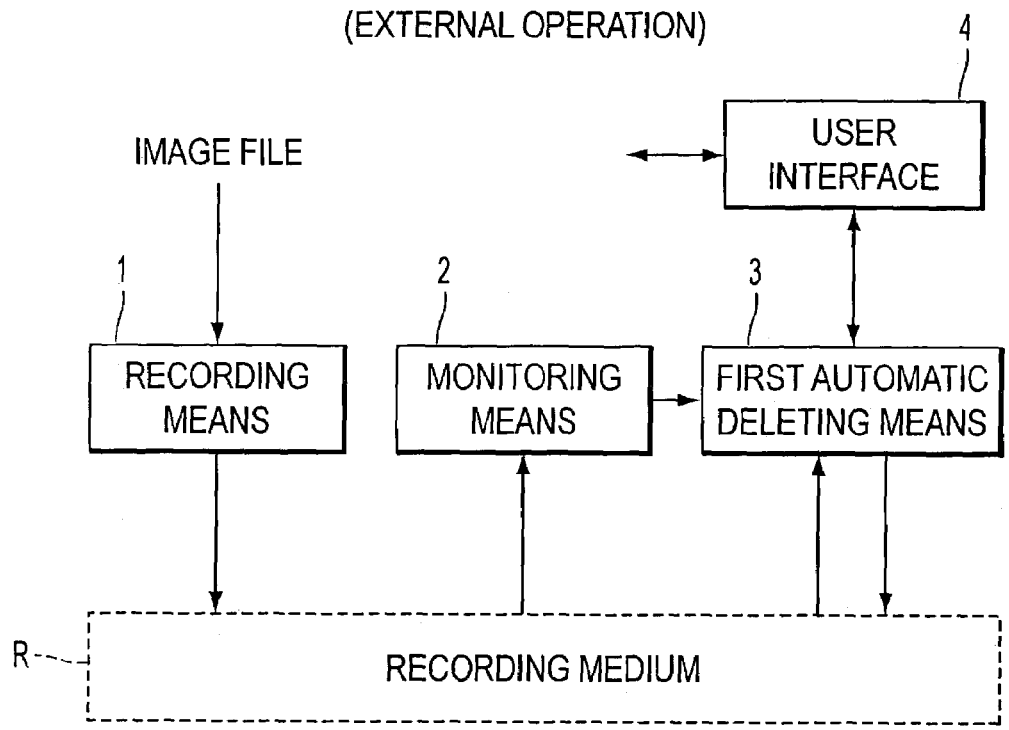
FIG. 2 is a high-level functional diagram of a second aspect of the invention.

Another aspect of the invention, as shown in FIG. 2, includes a user interface. 4 for presenting an image file anticipated to be deleted by the first automatic deleting means 3. The user interface inquires as to whether the deletion operation of the image file is approved. The first automatic deleting means 3 performs deletion of the image file if the deletion operation is approved via the user interface 4. This user interface 4 presents an image file anticipated to be deleted by the first automatic deleting means 3 and inquires as to whether the deletion operation of the image file is approved. The first automatic deleting means 3 executes file deletion processing on image files for which the deletion operation has been approved by the user interface 4.

Figure 3:
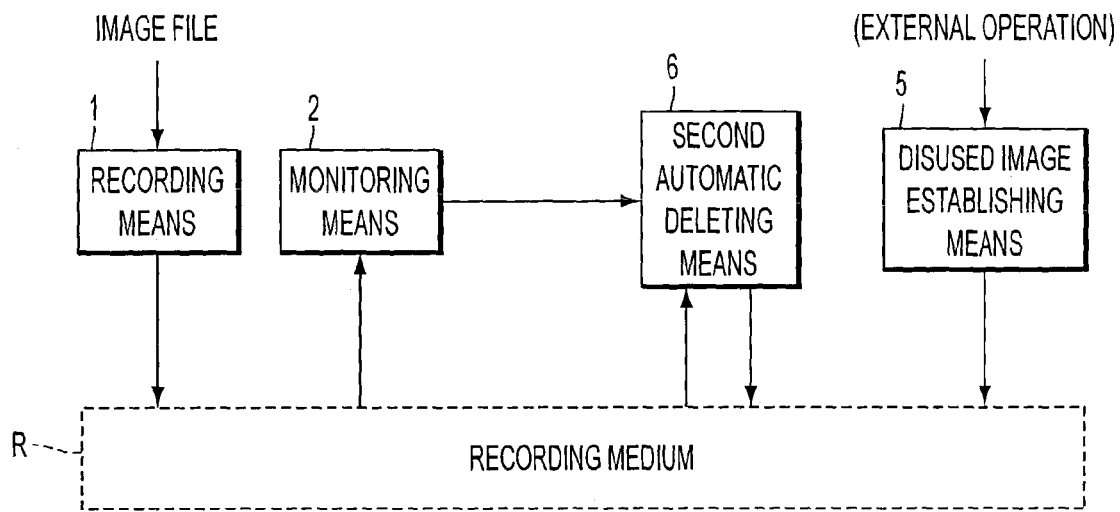
FIG. 3 is a high-level functional diagram of a third aspect of the invention.

As shown in FIG. 3, a further aspect of the invention includes a recording means 1 for acquiring an image file from an imaging component or an external terminal, and for recording the image file on a recording medium R. A disused image establishing means 5 establishes as to whether or not an image file on the recording medium R is disused in accordance with an external selection operation. A monitoring means 2 monitors the recording area of the recording medium R. A second automatic deleting means 6 deletes image files established as disused by the disused image establishing means 5 in accordance with the usage status of the recording medium R monitored by the monitoring means 2.

The recording means 1 acquires image files including image information, and the like. The recording means 1 records these image files on a recording medium R. The recording area of the recording medium R changes consequent to such recording operation. The monitoring means 2 monitors changes in the recording area. Meanwhile, the disused image establishing means 5 establishes whether or not an image file on the recording medium is disused, in accordance with the external operation selecting the image file. The second automatic deleting means 6 deletes image files established as disused by matching the usage conditions of the recording area monitored by the monitoring means 2.

The deletion operation may include an operation for overwriting, with another image file, a part or all of the recording area occupied by an image file that is to be deleted, and establishing a condition whereby overwriting is possible. By such operation, the available capacity on the recording medium R can be secured properly and automatically at a timing matched to the change of the usage status of the recording area.

In an even further aspect of the invention, the monitoring means 2 acquires or computes the available capacity of the recording area of the recording medium R and the second automatic deleting means 6 successively deletes image files established as disused by the disused image establishing means 5 each time the available capacity acquired or computed by the monitoring means 2 falls below a predetermined limit. The monitoring means 2 acquires or computes the available capacity of the recording medium R. The second automatic deleting means 6 successively deletes image files established as disused each time this available capacity falls below a predetermined limit.

In a further aspect of the invention, the second automatic deleting means 6 deletes image files established as disused by the disused image establishing means 5 in priority order of larger file capacity. By such operation, there is no more need to frequently delete image files for which the file capacity is small and the frequency of deletion of image files is reduced assuredly.

Figure 4:
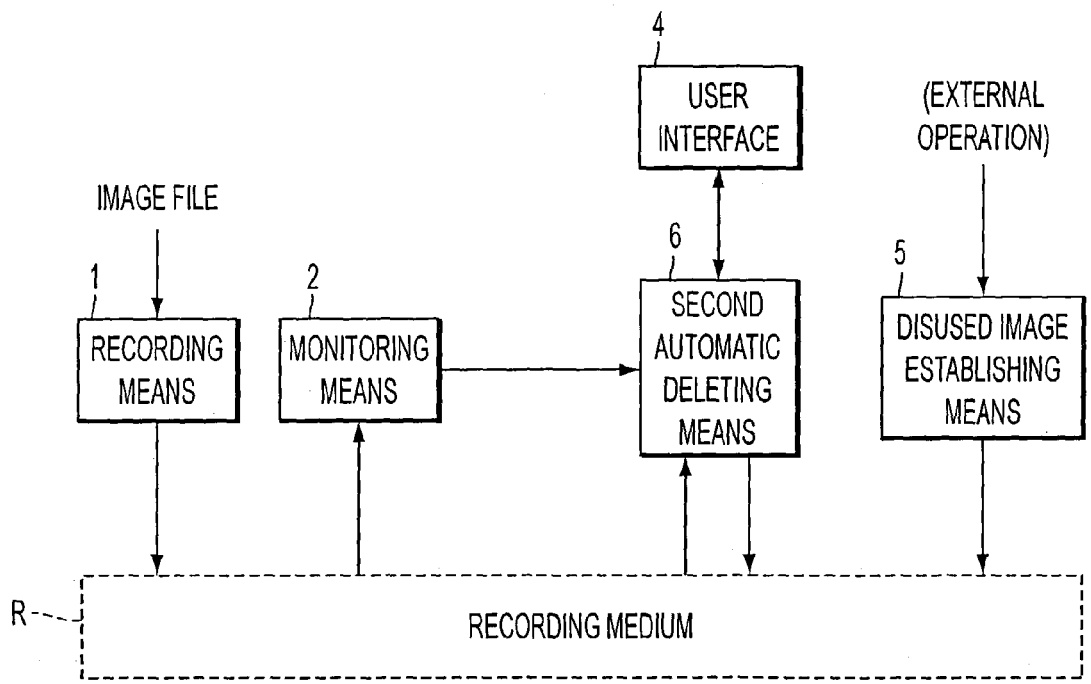
FIG. 4 is a high-level functional diagram of a fourth aspect of the invention.

Another aspect of the invention, shown in FIG. 4, further includes a user interface 4 for presenting an image file anticipated to be deleted by the second automatic deleting means 6, and inquires as to whether the deletion operation of the image file is approved. The second automatic deleting means 6 performs deletion of the image file if the deletion operation is approved via the user interface 4.

Figure 5:
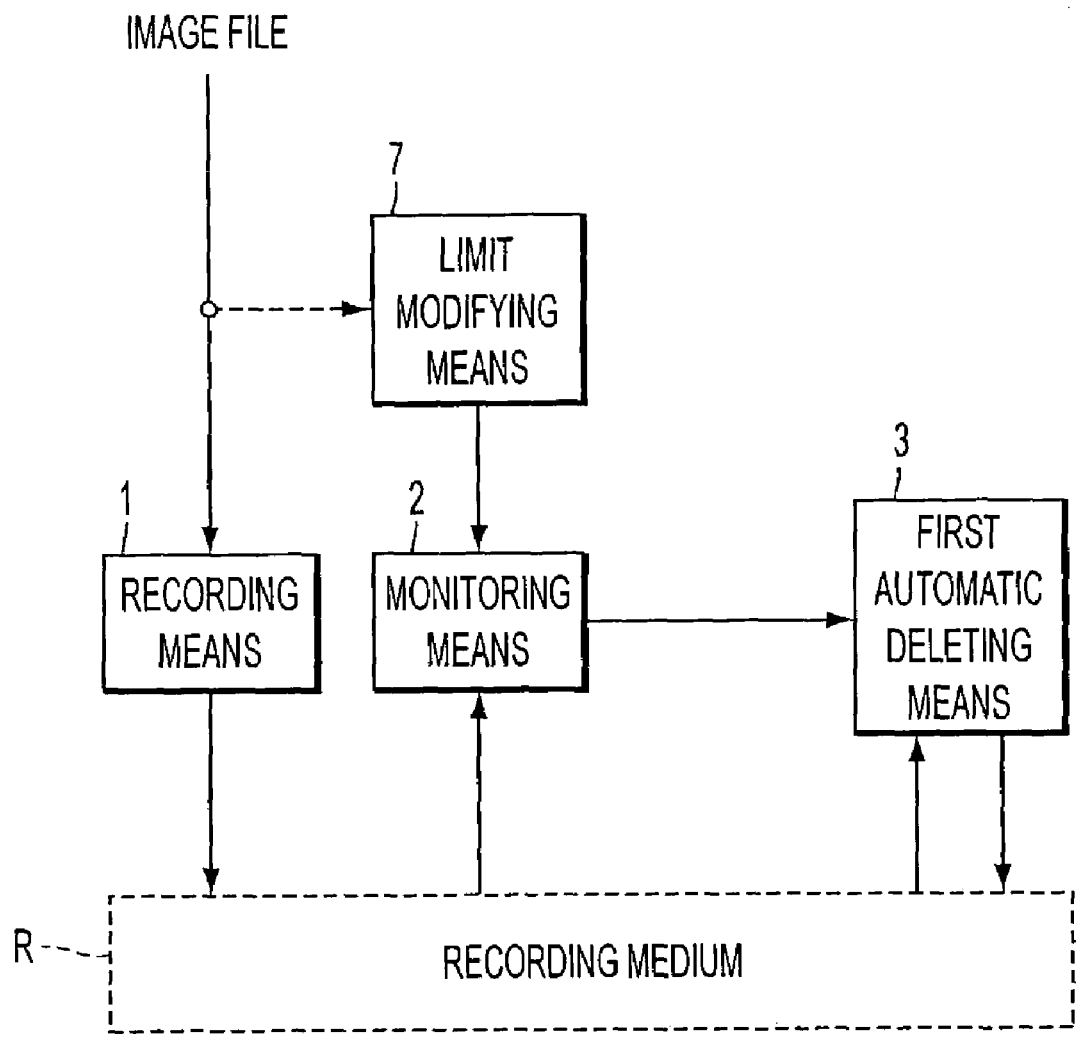
FIG. 5 is a high-level functional diagram of a fifth aspect of the invention.

Another aspect of the invention, shown in FIG. 5, further includes a limit modifying means 7 for raising and lowering the limit corresponding to the file capacity of image files acquired by the recording means 1. Consequently, it becomes possible to secure on the recording medium R the necessary available capacity at a timing matched to the file capacity of the acquired image file.

Embodiments of the present invention are now explained.

Figure 6:
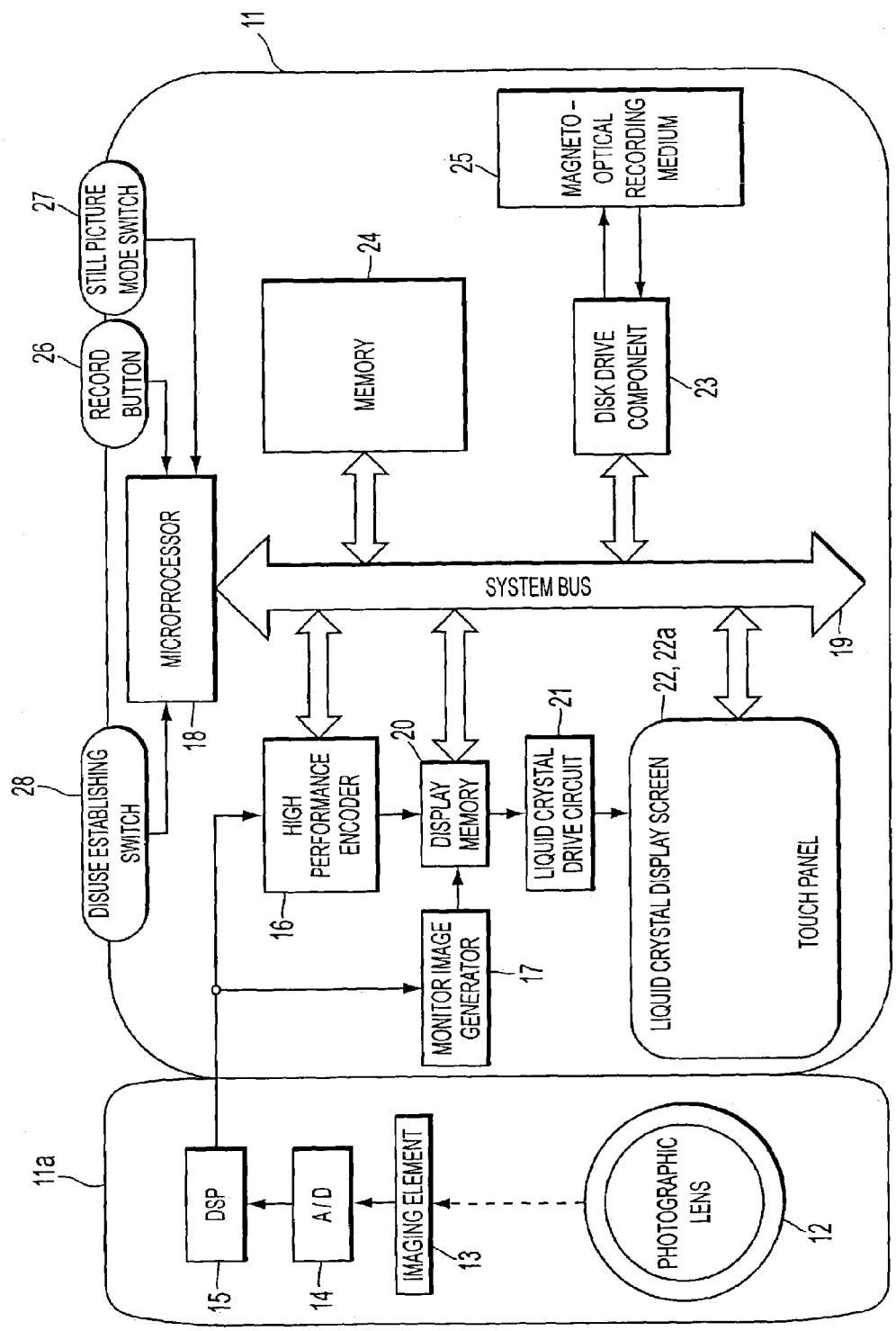
FIG. 6 is a block diagram of a first embodiment of the invention.
Figure 7:
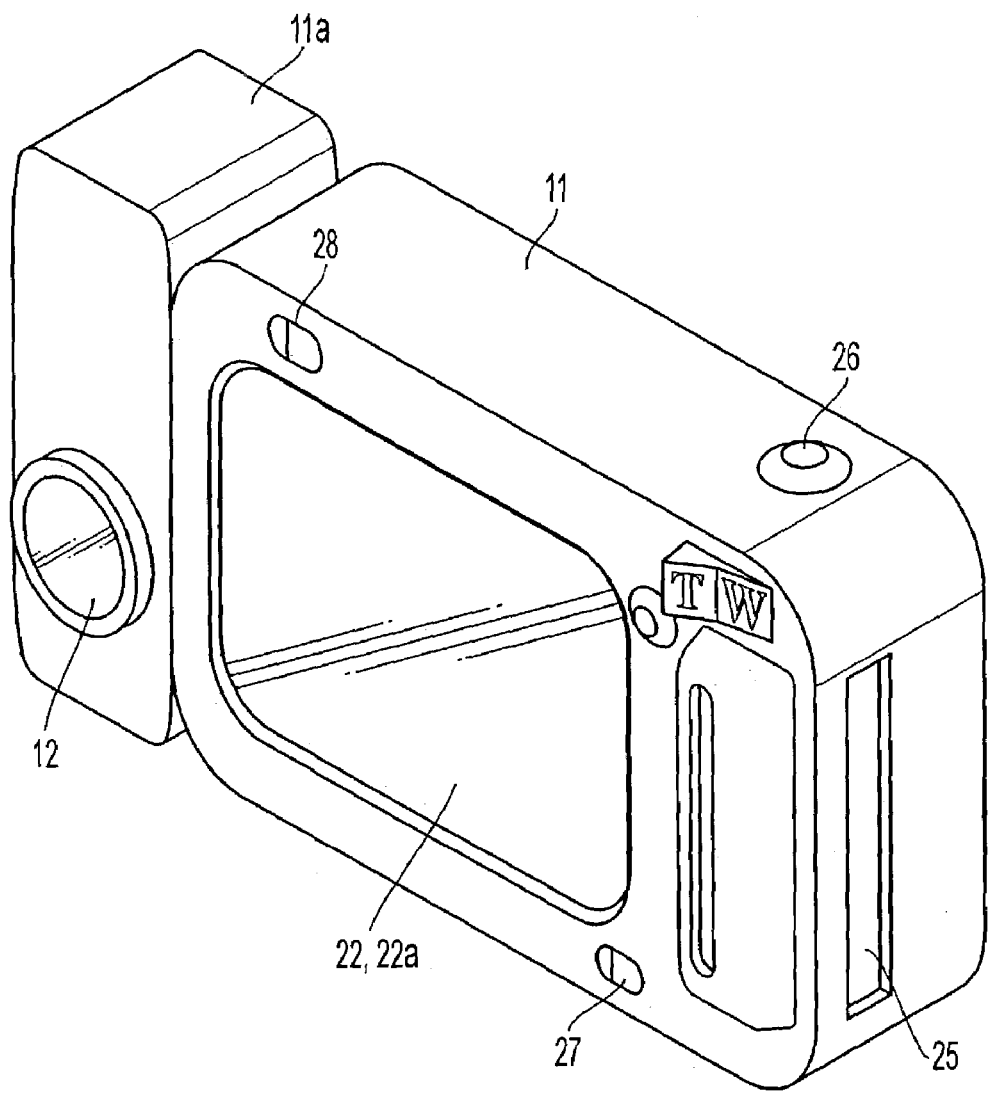
FIG. 7 is a perspective, external view of the first embodiment.

With reference to FIGS. 6 and 7, a first embodiment of the invention will now be described. A camera component 11a is attached to rotate freely on the side of the main body 11 of an electronic camera. A photographic lens 12 for acquiring the image of the object image is installed in the camera component 11a. The optical axis of the photographic lens 12 is refracted inside the camera component 11a. An imaging element 13 consisting of a CCD image sensor is disposed along the optical axis and receiving the image formed by lens 12. The photoelectric output of this imaging element 13 is transmitted via an A/D converter 14 to a video signal processor (digital signal processor—DSP) 15 for performing white balance adjustment and gamma correction, for example. The output of the video signal processor 15 is output to a high-performance encoder 16 and a monitor image generator 17. The output data of the high-performance encoder 16 is output to the system bus 19 of a microprocessor 18.

Meanwhile, the output data of the monitor image generator 17 is stored sequentially in display memory 20, and the read-out of the display memory 20 is input into a liquid crystal display component 22 via a liquid crystal drive circuit 21. On the liquid crystal display component 22 is attached a touch panel 22a for sensing the location of pressure of a finger or pen, or the like. The output of the touch panel 22a is provided to the system bus 19.

The system bus 19 is also connected to a display memory 20, disk drive 23 and a memory 24. The disk drive 23 includes a magnetooptical recording medium 25 which is inserted into the disk drive from outside the main body 11.

Furthermore, in the main body 11, there are disposed a record button 26, a still picture mode switch 27 for switching between a still picture photographic mode and a motion picture photographic mode, and a disuse-establishing switch 28 for establishing disused image files. The contact statuses of these switches 26-28 are relayed to the microprocessor 18.

Figure 8:
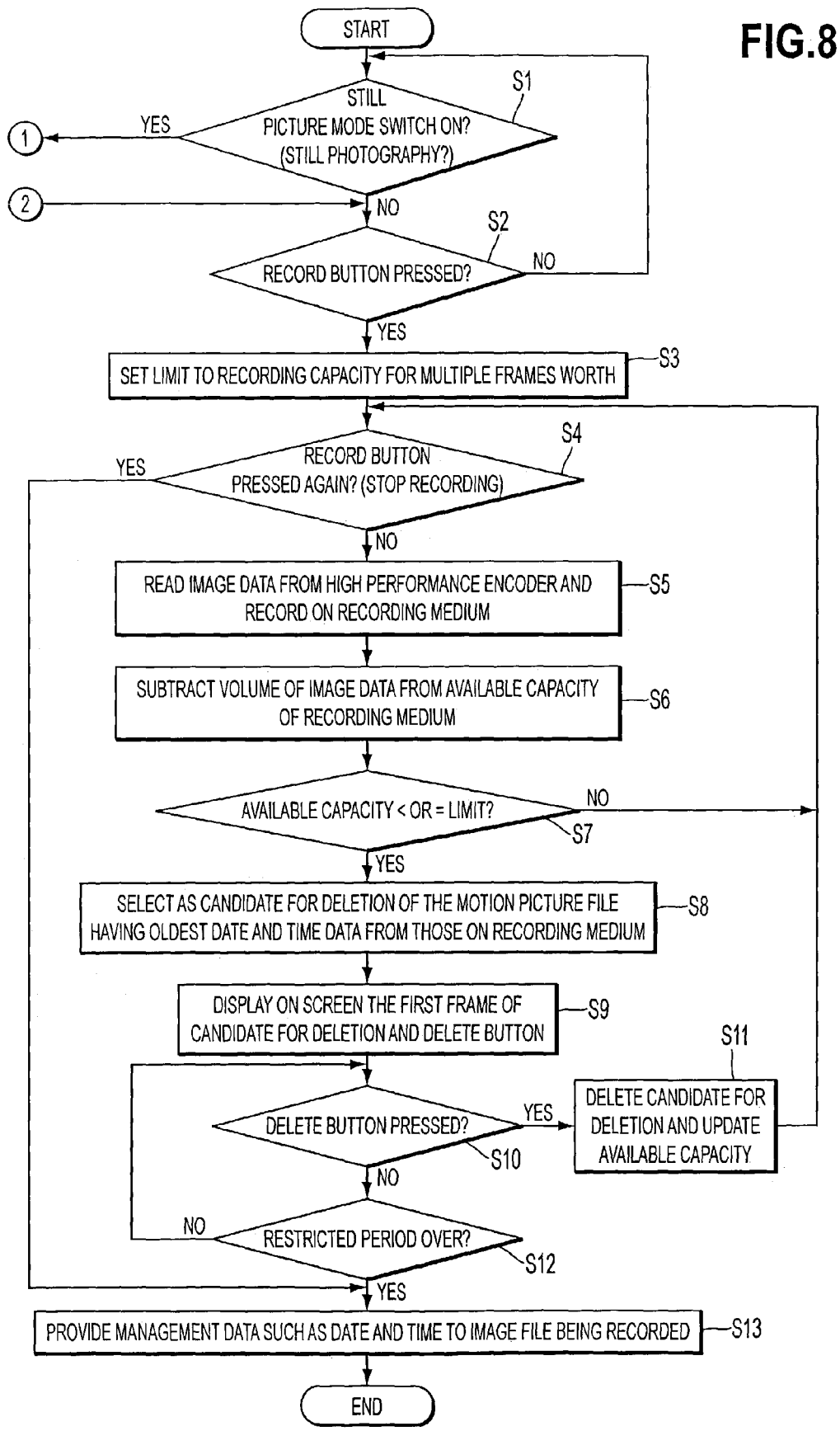
FIG. 8 is a flow chart showing the operation of the first embodiment.
Figure 9:
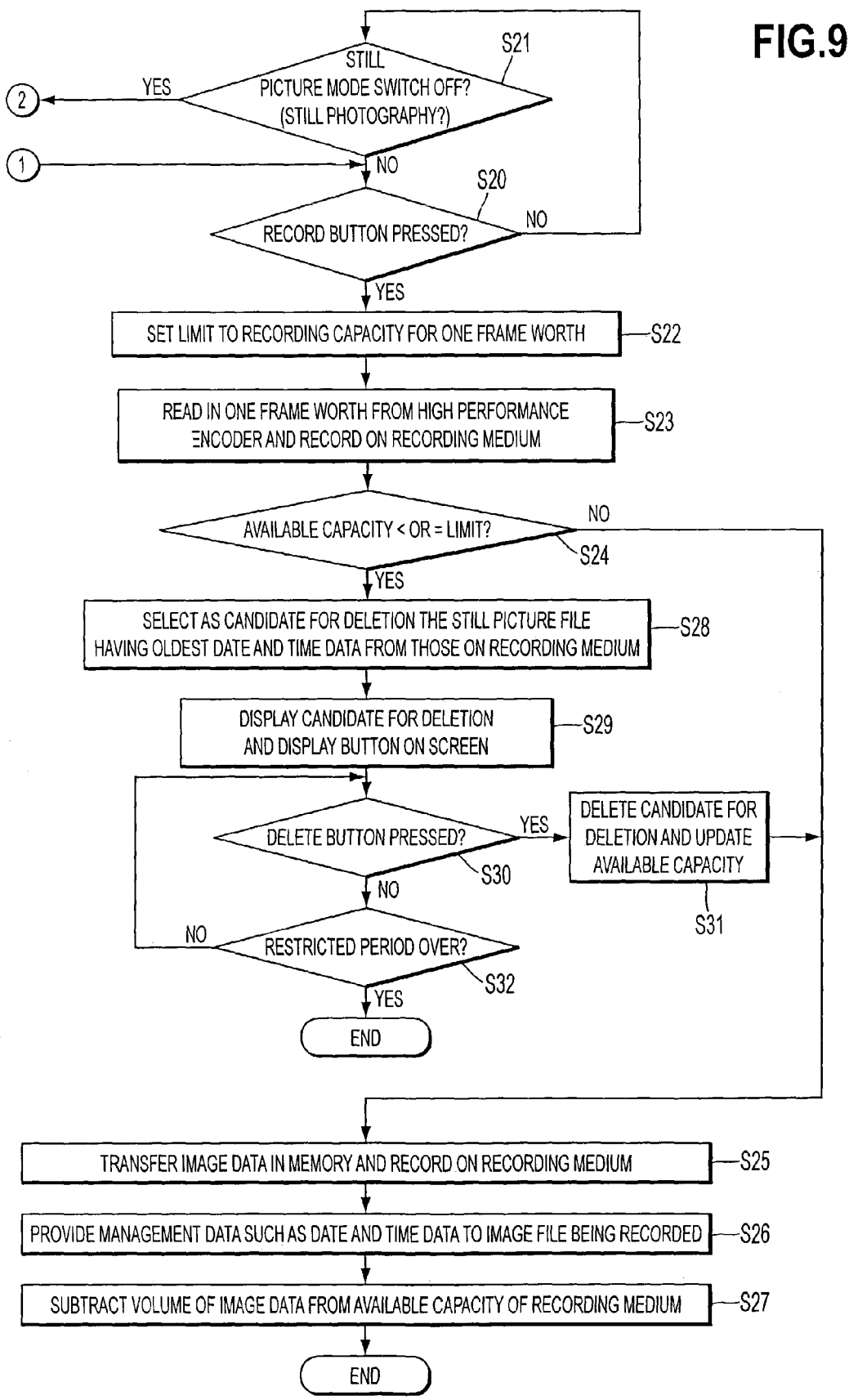
FIG. 9 is a flow chart (continuation) showing the operation of the first embodiment.

The operation of the first embodiment will now be explained using the flowcharts of FIGS. 8 and 9.

When the main power of the main body 11 is turned on, the imaging element 13 begins photoelectric conversion of the object image. The output of this imaging element 13 is converted into image data via the A/D converter 14 and video signal processor 15.

Figure 10:
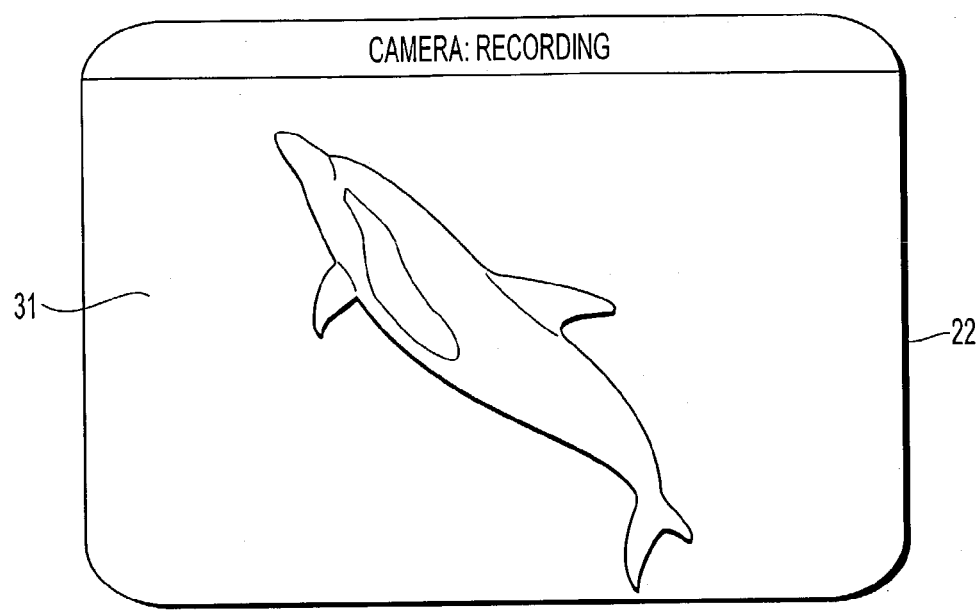
FIG. 10 is a drawing showing an example of the display of a monitor image.

The image data is read into the main body 11 and transferred to the display memory 20 via the monitor image generator 17. The liquid crystal drive circuit 21 successively reads out the image data from this video memory 20 and displays it to the liquid crystal display component 22. In so doing, the liquid crystal display component 22 displays a monitor image for recording, such as shown in FIG. 10.

Meanwhile, in the high-performance encoder 16, the image data read in from the video signal processor 15 is compression processed in accordance with the still picture/motion picture mode. That is, when the still picture mode switch 27 is in the off status (motion picture mode), interframe prediction with motion compensation is performed on the image data and prediction errors between frames are computed.

These prediction errors are divided into 8×8 blocks and DCT (discrete cosine transform) is applied thereto. The DCT coefficients thus computed are quantized according to a specified quantization table. Huffman encoding is further applied to this quantized data. The image data thus encoded is stored in multiple frames along with annexed data, such as motion vector and quantization table, in an internal buffer of the high-performance encoder 16. For example, motion picture images can be compressed/decompressed according to the MPEG standards.

Meanwhile, when the still picture mode switch 27 is in the on status (still picture mode), the image data is divided into 8×8 blocks and DCT (discrete cosine transform) is applied thereto. The DCT coefficients thus computed are quantized according to a specified quantization table. Huffman encoding is further applied to this quantized data. The image data thus encoded is stored in one frame along with annexed data such as motion vector and quantization table, in an internal buffer of the high-performance encoder 16. For example, still picture images can be compressed/decompressed according to the JPEG standards.

Concurrently with the operation as above, the microprocessor 18 determines whether or not the still picture mode switch 27 is in the on status (step S1) When the still picture mode switch 27 is set in the on status, the microprocessor 18 moves the operation to step S20 in order to perform still picture photography.

On the other hand, when the still picture mode switch 27 is in the off status, the microprocessor 18 returns to step S1 and repeats a waiting operation until the record button 26 is pressed. When the record button 26 is pressed (step S2) during such a period of repetition, the microprocessor 18 determines that the start of recording of a motion picture has been indicated and it begins the following recording operation of the motion picture mode. At first, the microprocessor 18, provided with motion picture image data, establishes the limit as the memory capacity for multiple frames worth of motion pictures (step S3). Here, when the record button 26 is again pressed (step S4), the microprocessor 18 determines that stopping of recording has been indicated and it moves the operation to step S15. On the other hand, when the record button 26 is not pressed again (step S4), the microprocessor 18 reads in the image data from the high-performance encoder 16. The microprocessor 18 transfers this image data to the disk drive 23 (step S5). The disk drive 23 writes the image data to the magnetooptical recording medium 25 each time the image data is stored in a specified amount of sectors.

Next, in the microprocessor 18, the present available capacity is computed by subtracting the volume of image data from the available capacity of the magnetooptical recording medium 25 (step S6). When the available capacity thus computed is larger than the limit (step S7), the microprocessor 18 determines that there is a surplus in the available capacity, returns to step S4, and repeats the recording operation described above. On the other hand, when the available capacity falls below the limit (step S7), the microprocessor 18 determines that the available capacity is insufficient. Then, the microprocessor 18 selects the image file having the oldest date and time based on the management data of the magnetooptical recording medium 25, and determines that image file to be a candidate for deletion (step S8). The microprocessor 18 transfers the leading image of this candidate for deletion and the image data of a delete button to the monitor memory 20 via the system bus 19 (step S9).

Figure 11:
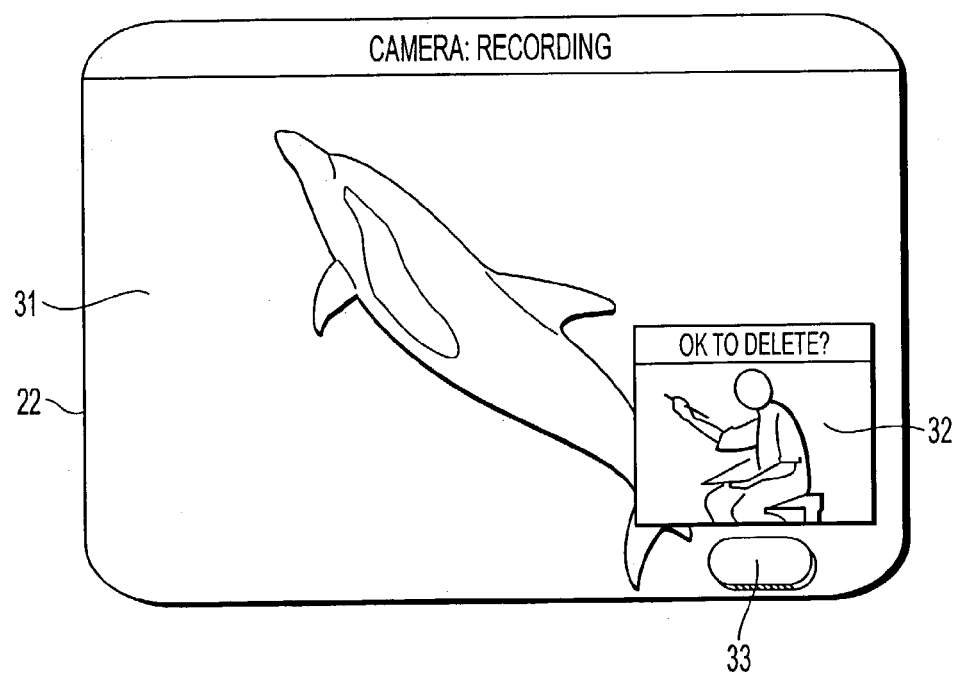
FIG. 11 is a drawing showing an example of the display of a candidate for deletion.

As a result, on the liquid crystal display 22 is formed an image such as shown in FIG. 11.

In FIG. 11, the leading image (the first image in the image file) of the candidate for deletion 32 is displayed in the form of a sub-window in a corner of the monitor. Preferably, this image is a reduced (thumbnail) image of the actual image. In the vicinity of this candidate for deletion 32 is displayed the delete button 33. In such a display status, the microprocessor 18 senses via the touch panel 22a whether or not the delete button 33 on the screen is pressed (step S10). When the delete button 33 is pressed, the microprocessor 18 deletes the candidate for deletion via the disk drive 23. Next, the microprocessor 18 increases the available capacity of the magnetooptical recording medium 25 by the capacity of the candidate for deletion (step S11).

The deletion operation sets the recording area occupied by the candidate for deletion to an overwrite-enabled status by modifying the management data of the magnetooptical recording medium 25. After such deletion operation is completed, the microprocessor 18 returns to step S4 and repeats the recording operation. On the other hand, when the delete button 33 is not pressed within a restricted (specified) period (step S12), since the unrecorded image data becomes stalled and overflows in the high-performance encoder 16, the microprocessor 18 abandons the continuation of recording of the image data. Thus, after the management data (such as the date and time data) has been provided, the microprocessor 18 ends the recording operation (step S13).

Meanwhile, in step S1, when the still picture mode switch 27 is set to the on status, the microprocessor 18 moves to step S20 and executes the still picture mode operation. First, the microprocessor 18 waits until the record button 26 is pressed (step S20). When the still mode switch 27 is changed to the off status during this wait (step S21), the microprocessor 18 determines that it has been set to a new mode and it returns to step S2. On the other hand, when the record button 26 is pressed during the wait (step S20), the microprocessor 18 determines that the start of recording of a still picture has been indicated and it begins the record operation of the still picture mode as described below.

First, the microprocessor 18, provided with the image data of the still picture, establishes the limit as the recording capacity for one frame worth of still picture data (step S22). Next, the microprocessor 18 reads in, from the high-performance encoder 16, the one frame worth of image data. The microprocessor 18 records this image data temporarily in memory 24 (step S23). The microprocessor 18 then performs a size comparison of the available capacity of the magnetooptical recording medium 25 and the limit (step S24). As a result of such comparison, when the available capacity is above the limit, the microprocessor 18 transfers the image data in memory to the disk drive 23 and records it on the magnetooptical recording medium 25 (step S25). The microprocessor 18 provides date and time data to the image file thus recorded (step S26).

Next, the microprocessor 18 subtracts the volume of image data from the available capacity of the magnetooptical magnetic recording medium 25 (step S27). After completion of such operation, the microprocessor 18 ends the still picture recording operation.

On the other hand, in step S24, when the available capacity is less than or equal to the limit, the microprocessor 18 selects a candidate for deletion having the oldest date and time data from the still picture files on the magnetooptical recording medium 25 (step S28). The microprocessor 18 transfers the image of this candidate for deletion and the image of a delete button to display memory 20 via the system bus 19 (step S29). As a result, on the liquid crystal display component 22 is formed an image such as shown in FIG. 11.

In such a display status, the microprocessor 18 senses via the touch panel 22*a* whether or not the delete button 33 on the screen is pressed (step S30) When the delete button 33 is pressed, the microprocessor 18 deletes the candidate for deletion via the disk drive 23. Next, the microprocessor 18 increases the available capacity of the magnetooptical recording medium 25 by the capacity of the candidate for deletion (step S31). After the deletion operation is completed, the microprocessor 18 moves to step S25 described above and again executes the still picture recording. If the delete button 33 is not pressed within a restricted period (step S32), the microprocessor 18 abandons the still picture recording.

By the operation explained above, in the first embodiment, when the available capacity of the magnetooptical recording medium 25 is insufficient, an image file having an old date and time is automatically deleted. Consequently, it becomes possible to automatically secure available capacity at an appropriate time. Thus, inconveniences, such as missing a valuable shooting opportunity, can be prevented without the user paying attention to the available capacity on the recording medium. Also, because the oldest image file is selected as a candidate for deletion, those which have already undergone archive processing, print processing, or those which are originally useless, can be deleted with high probability. Consequently, there is no particular need for the user to consciously select and delete image files and complications concomitant with a conventional deletion operation can be avoided. Furthermore, because the candidate for deletion is deleted after approval of the deletion operation has been confirmed, there is no risk of an important image file being deleted by accident.

Figure 12A:
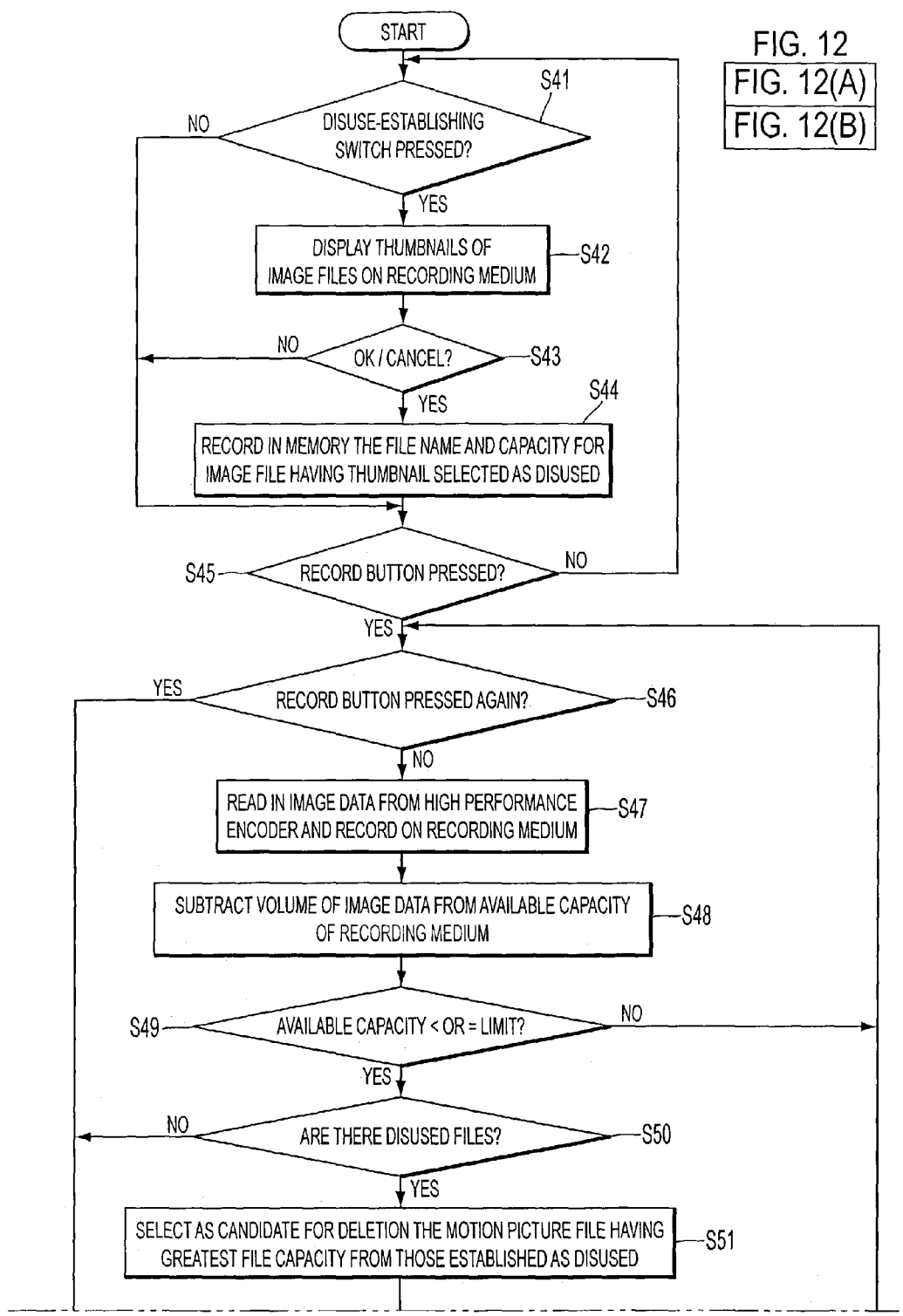
FIG. 12 is a flow chart showing the operation of a second embodiment of the invention.
Figure 12B:
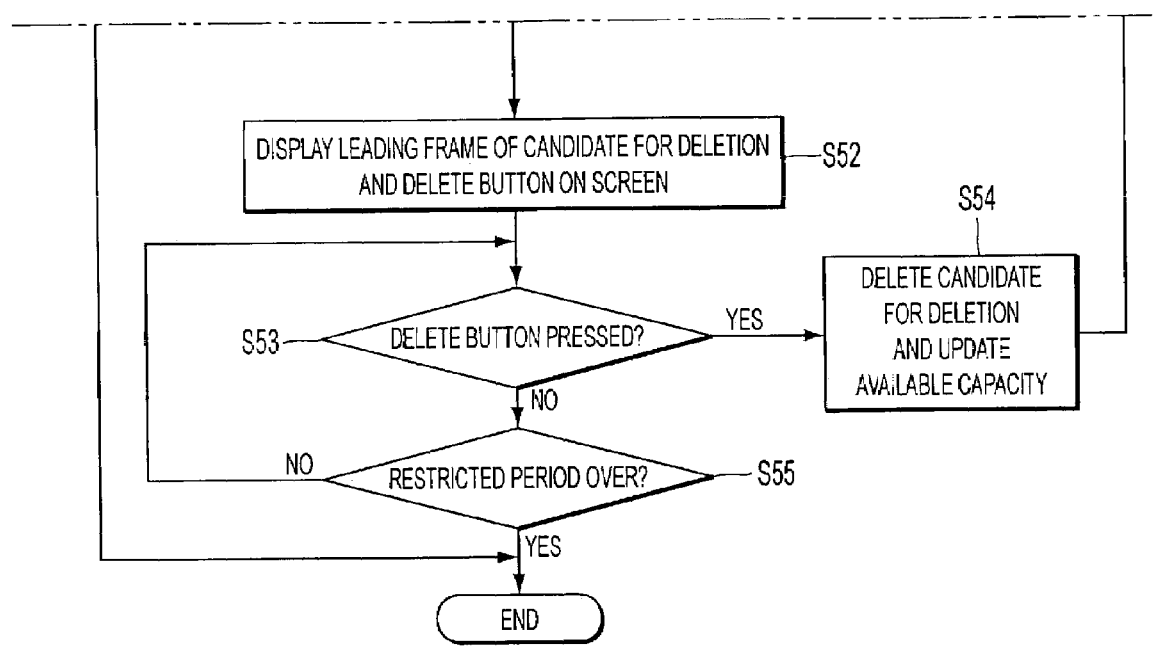

A second embodiment of the present invention will now be explained with reference to FIGS. 6, 7 and 12. The configuration of this second embodiment is identical to the configuration shown in FIG. 6 and FIG. 7, except for the internal functions of the microprocessor 18. Therefore, explanation of the general configuration is omitted.

Figure 13:
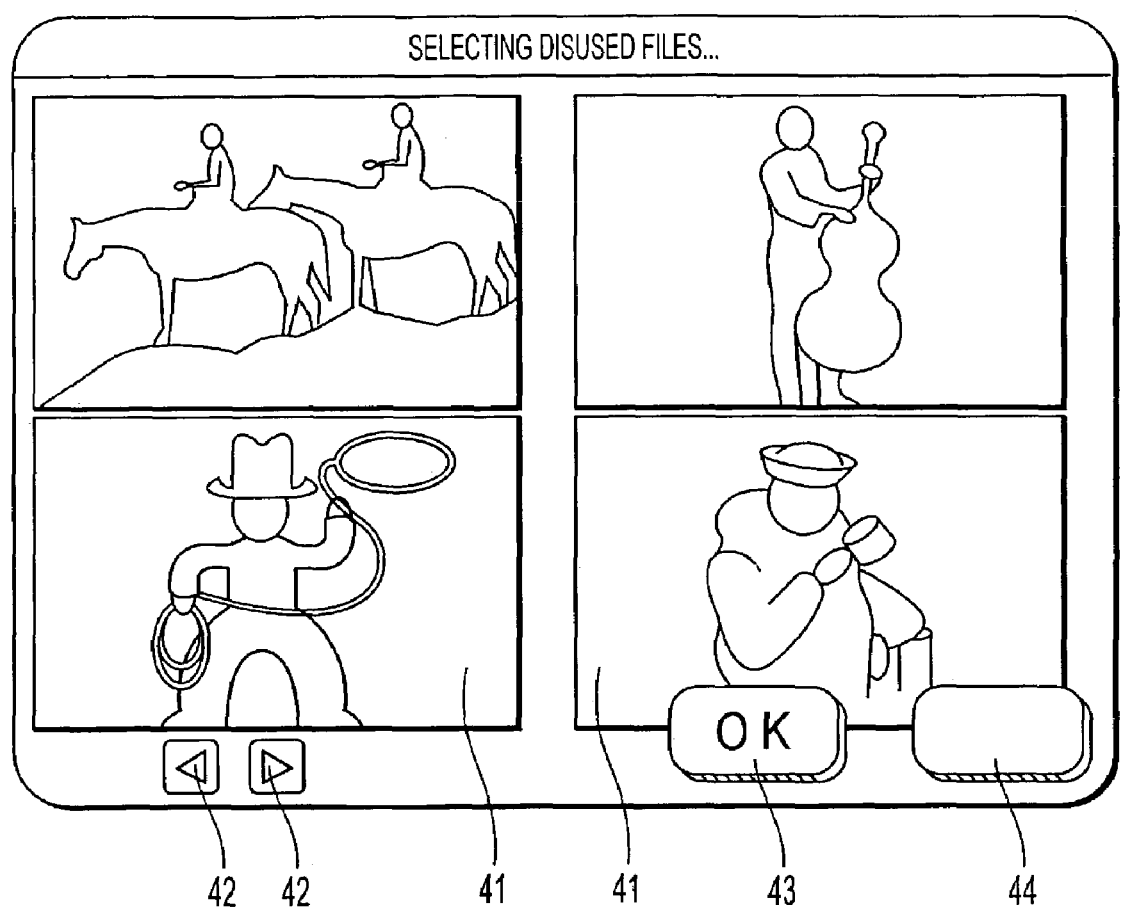
FIG. 13 is a drawing showing an example of the display during establishment of disuse.

First, when the disuse-establishing switch 28 is set in the off status (step S41), the microprocessor 18 moves the operation to step S45 without establishing disuse of an image file. On the other hand, when the disuse-establishing switch 28 is set in the on status (step S41), the microprocessor 18 lists the image files on the magnetooptical recording medium 25 in the thumbnail format shown in FIG. 13 (step S42). The thumbnails 41 are listed in the center of the liquid crystal display component 22 and scroll buttons 42, OK button 43 and cancel button 44 are displayed on the lower side of the screen. In this status, the microprocessor 18 sequentially senses the selection operations of the thumbnails by the user via the touch panel 22*a*. When the OK button 43 on the screen is pressed during thumbnail selection (step S43), the microprocessor 18 records in memory 24 the filename and file capacity of the selected image file (step S44).

On the other hand, when the cancel button 44 on the screen is pressed (step S43), the microprocessor 18 cancels the thumbnail selection and moves the operation to step S45.

Until the record button 26 is pressed (step S45), the microprocessor 18 returns to step S41 and repeats the operation described above.

When the record button 26 is pressed during such period of repetition (step S45), the microprocessor 18 determines that the start of recording of motion pictures was indicated and it begins the recording operation of the motion picture mode as described below.

First, when the record button 26 is again pressed (step S46), the microprocessor 18 determines that the stopping of recording was indicated and it ends the recording operation. On the other hand, when the record button 26 has been pressed only once (step S46), the microprocessor 18 reads in the image data from the high-performance encoder 16. The microprocessor 18 transfers this image data to the disk drive 23 (step S47). The disk drive 23 writes the image data to the magnetooptical recording medium 25 each time the image data has been stored in the capacity of a sector.

Next, the microprocessor 18 computes the present available capacity by subtracting the volume of the image data from the available capacity of the magnetooptical recording medium 25 (step S48). When the available capacity thus computed is greater than the limit (step S49), the microprocessor 18 determines that there is a surplus in available capacity and returns to step S46. On the other hand, when the available capacity falls below the limit (step S49), the microprocessor 18 determines whether or not disused image files have been established (step S50).

Here, when disused image files have not been specified (step S50), the microprocessor 18 abandons the execution of recording of image data and it ends the record operation of motion pictures. On the other hand, when disused files have been specified (step S50), the microprocessor 18 selects from the disused image files the one having the greatest file capacity and determines it as a candidate for deletion (step S51).

The microprocessor 18 transfers the leading image of the candidate for deletion and image data of a delete button to display memory 20 via the system bus 19 (step S52). As a result, on the liquid crystal display component 22 an image as shown in FIG. 11 is formed.

In such a display status, the microprocessor 18 senses via the touch panel 22*a* whether or not the delete button 33 on the screen has been pressed (step S53). When the delete button 33 is pressed, the microprocessor 18 deletes the candidate for deletion via the disk drive 23. Next, the microprocessor 18 increases the available capacity of the magnetooptical recording medium 25 by the capacity of the candidate for deletion (step S54). After deletion is completed, the microprocessor 18 returns to step S41 and repeats the recording operation.

On the other hand, when the delete button 33 is not pressed within a restricted (specified) period (step S55), the unrecorded image data becomes stalled and overflows in the high-performance encoder 16. Therefore, the microprocessor 18 abandons the continuation of recording of the image data and ends the recording operation.

By the above operation, the substantially same effect as that of the first embodiment can be achieved in the second embodiment. Furthermore, as an effect particular to the second embodiment, because image files established in advance as disused are made the object of deletion, there is no unintentional deletion of important image files. Also, because the image files are deleted in the order of larger file capacity from those established as disused, the frequency of deletion of image files can be reduced. Furthermore, image files established in advance as disused are presented and external approval is sought before executing the deletion operation. Consequently, there is no risk of image files accidentally having been established as disused being deleted by accident.

In the embodiments described above, the invention was explained in the context of an electronic camera. However, the image recording apparatus of the present invention is not limited to the configuration of an electronic camera. Generally, the invention can be applied to any image recording apparatus having the function of recording image files. For example, it may be applied to an image editing apparatus that applies image editing of image files and records newly created image files. In such an image editing apparatus, because the file capacity becomes greater after linking (concatenating) a plurality of images and editing, the available capacity of the recording medium is frequently insufficient. Consequently, application of the present invention to an image editing apparatus is well-suited.

Also, in the embodiments described above, the available capacity is computed. However, the present invention is not limited to computational methods of available capacity. For example, it may directly acquire the available capacity from the management area of the magnetooptical recording medium 25.

Furthermore, in the embodiments described above, the available capacity is monitored. However, the present invention is not limited to "the monitoring of available capacity," and it may monitor a quantity indicating the usage status of the recording area. For example, the recorded volume, general recording time, remaining recordable time, or the like, may be monitored. These quantities are particularly well-suited because the usage status of the recording medium can be presented to the user by displaying it directly to the screen.

Additionally, in the embodiments described above, magnetooptical recording medium 25 is used as the recording medium. However, the present invention is not limited to the material or form of the recording medium. For example, such recording media as a magnetic recording medium, optical recording medium, semiconductor memory (e.g., flash memory), and memory card may be used.

Furthermore, in the first embodiment described above, the oldest image file is made the candidate for deletion. However, the present invention is not limited to this. For example, an old image file may be made as a candidate for deletion by one or a multiple of such methods as threshold determination, fuzzy logic, and the like.

Also, in the first embodiment described above, only one candidate for deletion is selected. However, the present invention is not limited to one candidate for deletion. Multiple image files may be selected as candidates for deletion. In such case, the image files to be deleted may be inquired about on the screen by displaying multiple candidates for deletion at once or by displaying them one by one.

While this invention has been described in conjunction with specific embodiments thereof, it is evident that many alternatives, modifications and variations will be apparent to those skilled in the art. Accordingly, the preferred embodiments of the invention set forth herein are intended to be illustrative, not limiting. Various changes may be made without departing from the spirit and scope of the invention as defined in the following claims.

What is claimed is:

1. An image recording apparatus, comprising:
    memory means for temporarily storing an image file;
    recording means for recording said image file stored in said memory means together with time information on a recording medium;
    monitoring means for monitoring a recording area of said recording medium; and
    automatic deleting means for deleting image files for which said time information is relatively old compared to other image files on the recording medium in accordance with a usage status of the recording area monitored by said monitoring means.

2. An image recording apparatus as defined in claim 1, wherein:
    said monitoring means determines the available capacity of the recording area of said recording medium, and
    said automatic deleting means successively deletes image files for which said time information is oldest each time the available capacity determined by said monitoring means falls below a predetermined limit.

3. An image recording apparatus as defined in claim 1, further comprising:
    a user interface that presents an image file anticipated to be deleted by said automatic deleting means, and inquires whether or not the deletion operation of the image file is approved, wherein
    said automatic deleting means performs deletion of the image file when the deletion operation is approved via said user interface.

4. An image recording apparatus as defined in claim 2, further comprising limit modifying means for raising and lowering said predetermined limit.

5. A method for recording images using an image recording apparatus, comprising the steps of:
    acquiring an image file;
    temporarily storing said image file;
    recording said temporarily stored image file together with time information on a recording medium;
    monitoring a recording area of said recording medium; and
    automatically deleting image files for which said time information is relatively old compared to other image files in accordance with a monitored usage status of the recording area.

6. A method as defined in claim 5, wherein said monitoring step includes:
    determining the available capacity of the recording area of said recording medium, and wherein
    said deleting step successively deletes image files for which said time information is oldest each time the determined available capacity falls below a predetermined limit.

7. The method of claim 5, further comprising:
    presenting on a display an image file anticipated to be deleted in said automatic deleting step;
    inquiring on the display whether or not the deletion of the image file is approved; and
    deleting the image file when the deletion is approved.

8. An image recording apparatus, comprising:
    a memory device that temporarily stores images;
    a storage device that stores said images stored in said memory device as image files on a recording medium along with time information; and
    a controller coupled to said storage device to monitor a recording area of a recording medium in said storage device and to automatically cause said storage device to delete, from said recording medium, image files for which said time information is relatively old compared to other image files in said recording medium in accordance with the monitoring of a usage status of the recording area performed by said controller.

9. An image recording apparatus as defined in claim 8, wherein:

said controller determines the available capacity of the recording area of said recording medium, and automatically deletes image files for which said time information is oldest each time the determined available capacity falls below a predetermined limit.

10. An image recording apparatus as defined in claim 8, further comprising:

a user interface that presents a candidate image file to be deleted by said controller, and inquires whether or not the deletion operation of the candidate image file is approved, said controller deleting the candidate image file when the deletion operation is approved via said user interface.

11. An image recording apparatus as defined in claim 9, wherein said predetermined limit is adjustable.

12. An image recording apparatus as defined in claim 8, wherein the apparatus is an electronic camera, the electronic camera including a photographic lens that forms a light image of an object on a photoelectric converter that converts the light image into image signals that are stored in the recording medium.

13. An image recording apparatus as defined in claim 8, further comprising a display coupled to said controller, wherein said controller automatically selects the image file having the oldest time for deletion and, prior to deletion, displays said image file along with a graphical delete button on said display.

14. An image recording apparatus as defined in claim 13, wherein said display includes a touch panel for determining the location of a contact with said display and said controller senses via said touch panel whether or not said graphical deletion button is pressed and deletes said displayed image file when said delete button is pressed.

* * * * *